United States Patent
Chiang et al.

(10) Patent No.: US 10,067,898 B2
(45) Date of Patent: Sep. 4, 2018

(54) PROTOCOL ADAPTATION LAYER DATA FLOW CONTROL FOR UNIVERSAL SERIAL BUS

(71) Applicant: QUALCOMM Incorporated, San Diego, CA (US)

(72) Inventors: Mu-Huan Chiang, San Diego, CA (US); Xiaodong Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/631,566

(22) Filed: Feb. 25, 2015

(65) Prior Publication Data

US 2016/0246745 A1    Aug. 25, 2016

(51) Int. Cl.
  *G06F 3/00* (2006.01)
  *G06F 13/00* (2006.01)
  *H04L 12/28* (2006.01)
  *G06F 13/38* (2006.01)
  *G06F 13/26* (2006.01)
  *G06F 13/42* (2006.01)
  *G06F 13/12* (2006.01)

(52) U.S. Cl.
  CPC .......... *G06F 13/385* (2013.01); *G06F 13/128* (2013.01); *G06F 13/26* (2013.01); *G06F 13/4295* (2013.01); *G06F 2213/0042* (2013.01)

(58) Field of Classification Search
  CPC .............................. G06F 13/385; G06F 13/26
  USPC ...................... 710/48, 104; 370/389; 382/232
  See application file for complete search history.

(56) References Cited

U.S. PATENT DOCUMENTS

| | | | |
|---|---|---|---|
| 6,611,891 B1* | 8/2003 | Hewitt ................ | G06F 13/4027 710/104 |
| 6,892,243 B1* | 5/2005 | Skarpness ............. | G06F 13/122 709/234 |
| 7,747,086 B1* | 6/2010 | Hobbs ..................... | G06T 9/004 382/232 |
| 8,028,040 B1* | 9/2011 | Hobbs ................. | G06F 9/45558 370/389 |
| 9,240,951 B2* | 1/2016 | Sadeghi .................. | H04L 47/39 |
| 2007/0174533 A1 | 7/2007 | Tseng et al. | |

(Continued)

FOREIGN PATENT DOCUMENTS

WO    2009100391 A2    8/2009

OTHER PUBLICATIONS

"Media Agnostic Universal Serial Bus Specification," Release 1.0, Feb. 25, 2014, 173 pp.

(Continued)

*Primary Examiner* — Farley J Abad
*Assistant Examiner* — Henry W Yu
(74) *Attorney, Agent, or Firm* — Shumaker & Sieffert, P. A.

(57) ABSTRACT

In an example, a method for transmitting data includes determining, at a Universal Serial Bus (USB) host, a USB data transfer type of USB data being transmitted from the host device to a USB device, and determining a priority of the USB data based on the determined USB data transfer type. The example method also includes controlling transfer of the USB data from a protocol adaptation layer (PAL) of the USB host to a network layer of the USB host based on the determined priority.

26 Claims, 4 Drawing Sheets

(56) References Cited

U.S. PATENT DOCUMENTS

| | | | |
|---|---|---|---|
| 2010/0198999 A1* | 8/2010 | Nair | G06F 13/387 |
| | | | 710/33 |
| 2011/0022743 A1* | 1/2011 | Liu | G06F 13/36 |
| | | | 710/36 |
| 2014/0223042 A1* | 8/2014 | Chandra | H04L 45/62 |
| | | | 710/38 |

OTHER PUBLICATIONS

"Universal Serial Bus Specification," Revision 2.0, Apr. 27, 2000, 650 pp.
"Universal Serial Bus 3.1 Specification," Revision 1.0, Jul. 26, 2013, 631 pp.
International Search Report and Written Opinion—PCT/US2016/015447—ISA/EPO—dated Jun. 7, 2016 (10 pages).
Response to First Written Opinion dated Jun. 7, 2016, which was filed on Dec. 23, 2016, from corresponding PCT Application Serial No. PCT/US2016/015447 (18 pages).
Second Written Opinion dated Feb. 20, 2017 from corresponding PCT Application Serial No. PCT/US2016/015447 (7 pages).
Response to Second Written Opinion from corresponding PCT Application Serial No. PCT/US2016/015447 filed on Apr. 20, 2017 (21 pages).
International Preliminary Report on Patentability from corresponding PCT Application Serial No. PCT/US2016/015447 dated Jul. 7, 2017 (20 pages).

* cited by examiner

PROTOCOL ADAPTATION LAYER DATA FLOW CONTROL FOR UNIVERSAL SERIAL BUS

TECHNICAL FIELD

This disclosure relates to wireless communication techniques.

BACKGROUND

Mobile devices may take the form of mobile telephones, tablet computers, laptop computers, portable computers with wireless communication cards, personal digital assistants (PDAs), digital cameras, video gaming devices, portable media players, flash memory devices with wireless communication capabilities, wireless communication devices including so-called "smart" phones and "smart" pads or tablets, e-readers, or other of a wide variety of other types of portable devices. Mobile devices have become increasingly powerful with the addition of high-power processors, the capability to process media content, and the ability to interact with networks in the cloud. These improvements make it possible to develop new usage models for the mobile devices that provide a better user experience and improve productivity.

In addition, mobile devices and other computing devices (e.g., personal computers, mobile telephones, electronic handheld devices, gaming consoles, or other similar devices) may communicate with a variety of peripheral devices using a communication standard. One such communication standard includes a Universal Serial Bus (USB) connection. Some examples of peripheral devices that may use a USB connection include mice or other pointing/selecting devices, keyboards, digital cameras, printers, personal media players, mass storage devices such as flash drives, network adapters, and external hard drives. For many of those devices, USB has become a very common communication standard that facilitates peripheral device connection.

SUMMARY

The techniques of this disclosure generally relate to techniques for transferring data between electronic devices. For example, the techniques of this disclosure may be used to control the flow of USB data and reduce delivery latency of high priority packets. The techniques may help to prioritize USB data for transmission across a given medium based on a USB data transfer type of the data being transmitted. In some instances, the techniques may help to alleviate the issue of higher priority data packets that have stricter latency requirements from being delayed by relatively lower priority data packets.

In an example, a method for transmitting data includes determining at a Universal Serial Bus (USB) host, a USB data transfer type of USB data being transmitted from the host device to a USB device, determining a priority of the USB data based on the determined USB data transfer type; and controlling transfer of the USB data from a protocol adaptation layer (PAL) of the USB host to a network layer of the USB host based on the determined priority.

In another example, a device for transmitting data includes a memory configured to store Universal Serial Bus (USB) data, and one or more processors of a USB host device. The one or more processors configured to determine, at the USB host device, a USB data transfer type of USB data being transmitted from the host device to a USB device, determine a priority of the USB data based on the determined USB data transfer type, and control transfer of the USB data from a protocol adaptation layer (PAL) of the USB host to a network layer of the USB host based on the determined priority.

In another example, an apparatus for transmitting data includes means for determining, at a Universal Serial Bus (USB) host, a USB data transfer type of USB data being transmitted from the host device to a USB device, means for determining a priority of the USB data based on the determined USB data transfer type, and means for controlling transfer of the USB data from a protocol adaptation layer (PAL) of the USB host to a network layer of the USB host based on the determined priority.

In another example, a non-transitory computer-readable medium has instructions stored thereon that, when executed, cause one or more processors to determine, at a Universal Serial Bus (USB) host device, a USB data transfer type of USB data being transmitted from the host device to a USB device, determine a priority of the USB data based on the determined USB data transfer type, and control transfer of the USB data from a protocol adaptation layer (PAL) of the USB host to a network layer of the USB host based on the determined priority.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Computing devices (e.g., personal computers, laptop computers, tablet computers, mobile telephones such as so-called "smartphones," electronic handheld devices, e-readers, digital video cameras, digital cameras, hand-held gaming devices, gaming consoles, or other similar devices) may communicate with a variety of periphery devices using communication standard. One such communication standard includes a Universal Serial Bus (USB) connection. Some examples of peripheral devices that may use a USB connection include mice or other pointing/selection devices, keyboards, displays, digital cameras, printers, personal media players, mass storage devices such as flash drives, network adapters, and external hard drives. For many of those devices, USB has become a very common communication standard that facilitates peripheral device connection.

Accordingly, this disclosure may refer to a "USB device" as a peripheral device having a USB connection capable of communicating with a host computing device. In some examples, a host device may be a mobile device, such as a tablet computer, smartphone, or other portable electronic device. In some examples, a USB device and a host device may communicate according to a common USB communication specification. That is, in an example, a USB device may communicate with the host device according to the USB 2.0 specification, as revised and published on Jul. 26, 2010, available publically at: http://www.usb.org/developers/docs/usb_20_021411.zip. In another example, a USB device and a host device may be configured to communicate according to another USB specification, such as USB 3.1, as published on Jul. 26, 2013, available publically at http://www.usb.org/developers/docs/usb_31_121314.zip, or other serial bus standards or proprietary serial bus communication specifications that are currently available or may emerge in the future.

A host device may communicate with a USB device using a variety of media. As described in greater detail below, "medium" generally refers to the channel by which the host device and USB device are connected. In some examples, a host device may be in communication with a USB device using a wireless communication channel, such as a short-range communication channel, similar to WiFi, Bluetooth, or the like. However, the communication channel is not necessarily limited in this respect, and may comprise any wireless or wired communication medium, such as a radio frequency (RF) spectrum or one or more physical transmission lines, or any combination of wireless and wired media. In some examples, the communication channel may form part of a packet-based network, such as a local area network, a wide-area network, or a global network such as the Internet.

While not limited to any particular communications standard, the techniques of this disclosure may be applicable to the Media Agnostic USB standard, published on Feb. 25, 2014 and available publically at http://www.usb.org/developers/docs/devclass_docs/Media_Agnostic_USB_v1.0.zip (the "MA-USB" standard). One motivation for the Media Agnostic (MA) USB is to provide USB connectivity over a medium other than USB such as, for example, wireless or IP links, while making maximal use of existing USB infrastructure.

In order for a USB device to provide an acceptable user experience, the USB device may have latency requirements associated with the reception of data. For example, some types of USB data transfers may require lower latency than other types of USB data transfers in order to provide an acceptable user experience. A data transfer type may generally refer to a makeup of the data being communicated between the host device and the USB device. Example data transfer types include control transfers (e.g., for data associated with USB command and status operations), bulk transfers (e.g., for communication of time insensitive data), interrupt transfers (e.g., for non-periodic transfers of data that require bounded latency), and isochronous transfers (e.g., for periodic transfers of data that use a time-based delivery model). Other types of data transfers may also be possible. Certain data transfer types may be received by a particular endpoint at a USB device. For example, a bulk data transfer type may be referred to as being associated with a bulk endpoint, which an interrupt data transfer type may be referred to as being associated with an interrupt endpoint.

Some USB systems, such as the system described in the MA-USB standard referenced above, may use a buffer to regulate the flow of data between the host device and the USB device. Such buffering may be referred to as credit-based flow control, where a USB device indicates to the host device an amount of buffer space available for receiving data. The host device may then send as much data to the USB device as the USB device is able to accept. For example, in order to ensure efficient use of a communication medium, an outgoing transfer protocol may utilize a credit-based flow control to meter the flow of data from the host device to the USB device to an amount that may be successfully accepted into the USB device buffer. The USB device may inform the host device of its available buffer space. The host device may reduce the credit upon sending data to the USB device. The host device may allocate credit upon receiving acknowledgement that data has been transferred and removed from the buffer of the USB device.

In some instances, a USB device buffer may be relatively large, which may result in a large amount of available credit at the host device. In such instances, the host device may send a relatively large amount of data to the USB device. Sending a relatively large amount of data that includes a variety of USB data transfer types may result in lower priority data packets blocking higher priority packets from being transmitted within an acceptable amount of time. As an example, when a host device issues a number of bulk transfers prior to issuing an interrupt transfer, the host device may not transmit the interrupt data until transmitting all of the preceding bulk data. In this example, host device may not transmit the interrupt data within the latency requirements of the interrupt data.

In the context of USB communications, a network stack (also referred to as a protocol stack) may generally refer to one or more protocols responsible for transporting data between a host device and a USB device. That is, the network stack may be responsible for transmitting data packets over the particular media connecting the host device and the USB device. Some network stacks may have quality of service (QoS) support that prioritizes certain data. For example, a host device using the internet protocol (IP) may use a type of service (ToS) field in an IP header to distinguish different traffic types and provide higher priority of certain packets.

However, not all network stacks include QoS support. Some transport media may not have a defined QoS support (e.g., Bluetooth). In some examples, a host device may use a mode of operation that does not use QoS support even if such support is available. Moreover, even with QoS support at the network stack, latency may arise in instances in which multiple services generate data traffic of the same priority level (e.g., a device concurrently sending USB data and other audio/video data which are both categorized into the same priority level).

The techniques of this disclosure may be used to control the flow of USB data and reduce delivery latency of higher priority packets. For example, the techniques may help to prioritize USB data for transmission across a given medium based on a USB data transfer type of the data being transmitted. In some instances, the techniques may help to alleviate the issue of higher priority data packets that have stricter latency requirements from being delayed by relatively lower priority data packets.

According to aspects of this disclosure, a host device may implement the techniques at protocol adaptation layer (PAL). A USB PAL may enable connectivity between a host device and one or more USB devices. In some instances, a PAL may conform to one or more standards. In an example for purposes of illustration, a PAL may conform to the MA-USB standard and may enable connectivity between a host device and one or more USB devices over medium other than USB, including, for example, wireless and IP links.

The USB PAL is separate from a network layer associated with a network stack. For example, as described in greater detail below, a host PAL may be responsible for management of USB devices and transport of USB payload over a given transport medium. The host PAL may run on top of the network slack and issue data to the network stack for delivery over the transport medium. Accordingly, the techniques of this disclosure are different than the QoS support commonly associated with a network stack and noted above. That is, the techniques may be used to control the flow of data from a host device to a transport layer, while the transport layer may be responsible for delivery of the data over the transport medium (and may or may not implement its own, separate flow control techniques).

While certain techniques of this disclosure are described with respect to the USB standards, it should be understood that the USB standards are only some examples of a communication standard that may be consistent with this disclosure. Thus, although the techniques are described in the context of USB standards, other similar communication standards (e.g., an IEEE 1394 standard, an Ethernet standard, a Serial Advanced Technology Attachment standard, a high-definition multimedia interface (HDMI) standard, and a Thunderbolt standard) or even future communication standards or techniques may likewise benefit from the teaching of this disclosure.

Figure 1:
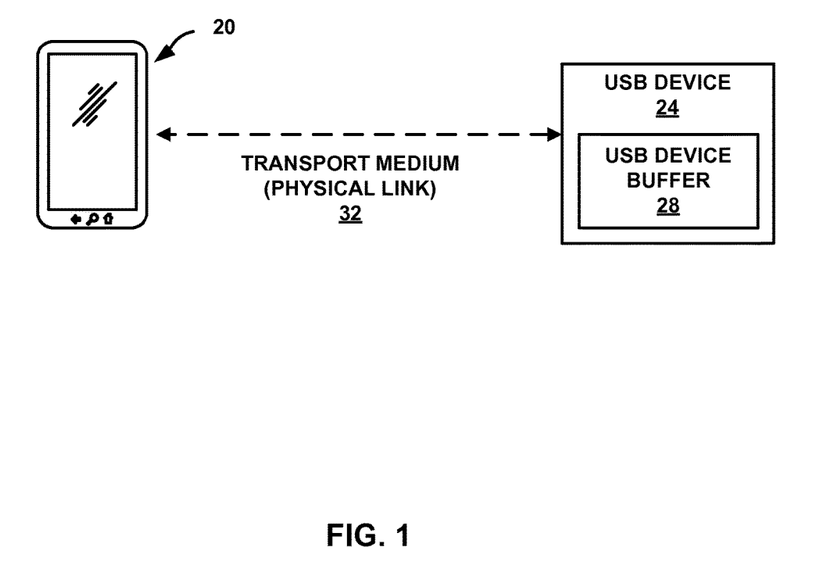
FIG. 1 is a conceptual diagram illustrating a USB host in communication with a USB device.

FIG. 1 is a block diagram illustrating an example system having a host device 20 that is in communication with a USB device 24 having a USB device buffer 28 over a transport medium (32) (which may also be referred to as a "physical link").

Host device 20 includes an electronic device capable of hosting (e.g., communicating) with one or more other devices, such as USB device 24. In some examples, host device 20 may include a smartphone, tablet, or other mobile device. While primarily described with respect to mobile devices such as smartphones and tablets, host device 20 may include any electronic device capable of hosting one or more other devices, and may be integrated, for example, into appliances, automobiles, aircraft, watercraft or any other device capable of performing the data transfer capabilities consistent with the techniques described herein. In some examples, host device 20 may be implemented as one or more microprocessors, digital signal processors (DSPs), application specific integrated circuits (ASICs), field programmable gate arrays (FPGAs), discrete logic, software, hardware, firmware or any combinations thereof.

While not shown for purposes of clarity, host device 20 may include a memory comprised of any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), magnetic random access memory (MRAM), FLASH memory, and the like. The memory may comprise a computer-readable storage medium for storing audio data, video data, as well as other kinds of data. Host device 20 may also include a modem and a transmitter/receiver unit that includes various mixers, filters, amplifiers and other components designed for signal modulation, as well as one or more antennas and other components designed for transmitting and receiving data.

USB device 24 may include any of a wide variety of devices that conform to a USB communication standard for communication with host device 20. In some instances, USB device 24 may be a human interface device (HID). For example, USB device 24 may be an input device that allows a user to interact with host device 20. Example HIDs may include a mouse, keyboard, trackpad, camera, or the like. In other examples, USB device may be a mass storage device, a display, or any other device capable of communicating via a USB standard.

In the example shown in FIG. 1, USB device 24 includes USB device buffer 28. USB device buffer 28 may include a memory comprised of any of a wide variety of volatile or non-volatile memory. As described in greater detail below, USB device buffer 28 may store data received from host device 20. In some instances, USB device 24 may initially inform host device 20 of a size of USB device buffer 28 prior to receiving data from host device 20.

Host device 20 may communicate with USB device 24 via wired or wireless transport medium 32 (which may also be referred to as a physical link or simply link). Accordingly, transport medium 32 generally represent any suitable communication medium, or collection of different communication media, for transmitting data between the devices shown in FIG. 1. Transport medium 32 may include relatively short-range communication channels, similar to WiFi, Bluetooth, or the like. However, transport medium 32 is not necessarily limited in this respect, and may comprise any wireless or wired communication medium, such as a radio frequency (RF) spectrum or one or more physical transmission lines, or any combination of wireless and wired media.

Transport medium 32 may even form part of a packet-based network, such as a local area network, a wide-area network, or a global network such as the Internet. Transport medium 32 may be infrastructure assisted, or may be peer-to-peer. The devices of FIG. 1 may communicate over transport medium 32 using a communications protocol such as a standard from the IEEE 1402.11 family of standards, or any other communication protocol or format, as described in greater detail below with respect to FIG. 3.

In some examples, the devices of FIG. 1 communicate via wired or wireless connections that conform to a USB standard or other wireless transmission standard, such as WiFi. For example, as noted above, the devices of FIG. 1 may communicate in conformity with the USB 2.0 specification, the USB 3.0 specification, or other standards or proprietary communication specifications that are currently available or may emerge in the future. In some examples, host device 20 and USB device 24 may communicate using the MA USB standard, which may enable USB connectivity over transport medium 32 other than USB, for example, wireless or IP links, while making maximal use of existing USB infrastructure.

In general, when communicating using a USB standard, host device 20 may facilitate data transfer with USB device 24. In order for USB device 24 to provide an acceptable user experience, USB device 24 may have data latency requirements. For example, some types of USB data transfers may require lower latency than other types of USB data transfers in order to provide an acceptable user experience. Example data transfer types include control transfers, bulk transfers, interrupt transfers, and isochronous transfers. In general, bulk transfers are used for time insensitive communication (e.g., transferring files to a flash drive) between the host and the device. Interrupt transfers are generally non-periodic transfers which require bounded latency. Isochronous transfers generally support data streams that (1) require periodic delivery, and (2) are tolerant to occasional data losses.

Upon connecting with USB device 24, host device 20 may initially receive an indication of the size of USB device buffer 28. In some examples, host device 20 may use USB device buffer 28 to regulate the flow of data between host device 20 and USB device 24. Such buffering may be referred to as credit-based flow control. Using this model, host device 20 may send as much data to USB device 24 as USB device 24 is able to accept. For example, host device 20 may reduce an amount of credit available at USB device 24 upon sending data to USB device 24. Host device 20 may allocate credit upon receiving acknowledgement that data has been transferred and removed from USB device buffer 28.

In some instances, USB device buffer 28 may be relatively large, which may result in a large amount of available credit at host device 20. In such instances, host device 20 may send a relatively large amount of data to USB device 24. Sending a relatively large amount of data that includes a variety of USB data transfer types may result in lower priority data packets blocking higher priority packets from being transmitted within an acceptable amount of time.

According to aspects of this disclosure, host device 20 may control the flow of USB data to USB device 24 to reduce delivery latency of certain data packets. For example, host device 20 may implement data flow control techniques that prioritize USB data for transmission across a given medium based on a USB data transfer type of the data being transmitted. In some instances, the techniques may help to alleviate the issue of higher priority data packets that have stricter latency requirements from being delayed by relatively lower priority data packets.

According to aspects of this disclosure, host device 20 may implement the techniques at the USB PAL. In an example, according to aspects of this disclosure, host device 20 may determine a USB data transfer type of USB data being transmitted from host device 20 to USB device 24. Host device 20 may, based on the determined transfer type, determine a priority of the USB data. Host device 20 may then transfer the USB data from a PAL of host device 20 to a network layer of host device 20 based on the determined priority for transmission of the data across transport medium 32.

In an example for purposes of illustration, host device 20 may determine whether the transfer type of the data is bulk, interrupt, isochronous, or another transfer type. Host device 20 may assign a higher priority to one or more of these transfer types than other transfer types. For example, host device 20 may assign a higher priority to interrupt and isochronous transfers than bulk transfers.

In some examples, host device 20 may determine the priority of the USB data being sent to USB device 24 using a threshold for outstanding transfers (i.e. a data transfer for which requests have been released to the network stack, but the responses have not yet been received) of the USB data transfer type. For example, host device 20 may divide USB data being sent to USB device 24 into a number of transfer requests (TransferReq), with each transfer request associated with its own request identifier and sequence number. Host device 20 may receive, from USB device 24, a transfer response (TransferResp) that includes the request identifier, sequence number, as well as other data. Host device 20 may then send USB device 24 an acknowledgement (TransferAck) that the transfer has been received, which USB device 24 may use as a signal that the data may be removed from USB device buffer 28.

According to aspects of this disclosure, host device 20 may determine thresholds for controlling the number of outstanding transfer requests (e.g., transfer requests that have been issued that have not been acknowledged) for one or more transfer types. In some examples, when a number of outstanding transfer requests of the transfer type of the USB data being transmitted is lower than or equal to the threshold, host device 20 may transfer the USB data from the PAL of host device 20 to a network layer of host device 20. Conversely, when the number of outstanding transfer requests of the transfer type of the USB data is greater than the threshold, host device 20 may buffer the USB data in a transfer queue at the PAL of host device 20 until the number of outstanding transfer requests of the transfer type of the USB data is lower than or equal to the threshold.

Limiting the number of outstanding data transfer requests of a particular data transfer type using the above-described thresholds may impact latency experienced at a buffer associated with a network layer of host device. For example, host device 20 may restrict the number of outstanding transfer requests of a particular to the threshold number, but may allow all other data transfer types to be sent to the network layer without restriction. Restricting the number of outstanding data requests of the particular type may prevent host device 20 from sending such data to the network layer (e.g., and instead buffering the data at host PAL 64. By controlling the data transfers in this way, host device 20 may manage the amount of data of the particular type that is buffered at the network layer, thereby allowing data of other transfer types to be processed at the network layer more quickly.

According to aspects of this disclosure, host device 20 may determine thresholds for each transfer type or less than all of the transfer types. In an example for purposes of illustration, host device 20 may limit the number of outstanding bulk transfer types using a threshold for bulk data transfers only. In this example, host device 20 may restrict the number of outstanding bulk transfer requests to the threshold number, but may allow all other data transfer types to be sent to the network layer without restriction.

In some examples, host device 20 may dynamically determine the one or more thresholds. For example, host device 20 may dynamically determine a data transfer type threshold based on latency associated with delivering certain USB data from host device 20 to USB device 24. In an example, host device 20 may measure an amount of time associated completing the transfer of interrupt data (e.g., TransferCompleteTime). In this example, host device 20 may reduce the threshold for outstanding bulk transfer requests when the amount of time for completing the transfer of the interrupt data is relatively high, and may reduce the threshold for outstanding bulk transfer requests when the amount of time for completing the transfer of the interrupt data is relatively low. Additionally or alternatively, host device 20 may use a variety of other techniques for determining thresholds, as described in greater detail below.

While FIG. 1 illustrates host device 20 communicating only with a single USB device 24, the techniques are not limited in this way. In other examples, host device 20 may communicate with multiple USB devices and/or a variety of other devices that do not necessarily conform to a USB communication standard, as described in greater detail below.

Figure 2:
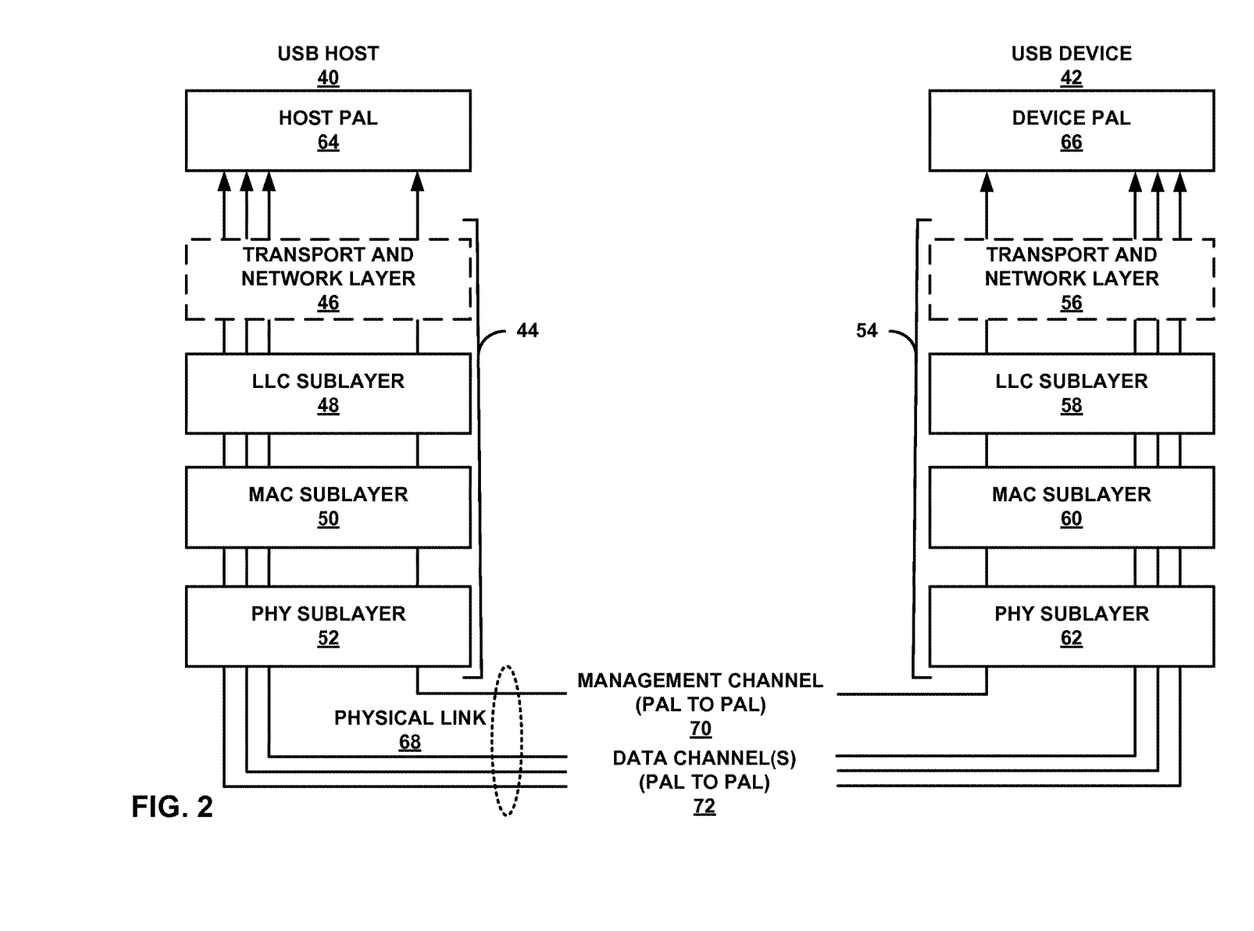
FIG. 2 is a block diagram illustrating an example USB protocol hierarchy.

FIG. 2 is a block diagram illustrating an example USB protocol hierarchy for a USB host 40 and a USB device 42. In some examples, USB host 40 and USB device 42 may be configured similarly to host device 20 and USB device 24 described above with respect to FIG. 1. The techniques described with respect to FIG. 2, however, may be implemented by a variety of other devices.

In the example, of FIG. 2, USB host 40 includes a network slack 44 having transport and network layer 46, logical link control (LLC) sublayer 48, media access control (MAC) sublayer 50, and physical (PHY) sublayer 52. USB device 42 is configured reciprocally and includes a network stack 54 having transport and network layer 56, LLC sublayer 58, MAC sublayer 60, and PHY sublayer 62. It should be understood that network stack 44 and network stack 54 are merely examples, and other network stacks may have more, fewer, or different components than those shown in FIG. 2. USB host 40 also includes host PAL 64, while USB device 42 includes device PAL 66.

USB host 40 and USB device 42 are connected via physical link 68, which may include a variety of wired or wireless links. In the example of FIG. 2, physical link 68 includes management channel 70 and data channels 72. Physical link 68 may generally represent any suitable communication medium, or collection of different communication media, for transmitting data between USB host 40 and USB device 42 including, for example, any wireless or wired communication medium, such as WiFi, Bluetooth, an RF spectrum or one or more physical transmission lines.

The network stacks for USB host 40 and USB device 42 may perform similar functions. For example, transport and network layer 46 and transport and network layer 56 may be responsible for adding heading information for transmission of data over physical link 68. In some examples, transport and network layer 46 and transport and network layer 56 may include a number of protocols. For example, transport and network layer 46 and transport and network layer 56 may include a transmission control protocol (TCP) that runs on top of user datagram protocol (UDP) that runs on top of Internet protocol (IP) (TCP/UDP/IP). LLC sublayer 48 and LLC sublayer 58 may be included in a data link layer of the respective network stacks and may provide multiplexing for networking protocols. MAC sublayer 50 and MAC sublayer 60 may generate MAC packets from the content received from the LLC sublayers. PHY sublayer 52 and PHY sublayer 62 may convert MAC packets into PHY layer packets for transmission over physical link 68.

In general, host PAL 64 and device PAL 66 are responsible for forming USB data packets and pushing the data packets to the respective network stacks for transmission over physical link 68. As noted above with respect to FIG. 1, PAL data packets may belong to a variety of different USB data transfer types including, for example, control, bulk, interrupt, and isochronous. In addition, some USB data transfer types may have different latency requirements than other data transfer types. For example, isochronous transfers may carry time-dependent data. Interrupt transfers (which may typically be used by HID peripherals) may require relatively low packet delivery latency to meet user experience requirements. In some instances, minimum latency requirements vary for different use cases (e.g., a user may relatively sensitive to pointer lag associated of a USB mouse cursor, so there may be relatively low tolerance for packet delivery latency).

After host PAL 64 sends data packets to network stack 44, the packets may remain buffered in a queue associated with network stack 44 prior to actual transmission. For example, there may be sleep/wake scheduling functions that may delay the network stack 44 from sending data packets, or there may be more than one functional block that shares network stack 44 (e.g., a wireless local area network (WLAN) sharing a radio block with a Bluetooth module). In some examples, data packets may also be buffered at network stack 44 due to a maximum transport throughput and/or changing conditions at physical link 68 such as low bandwidth availability.

In some instances, network stack 44 may include some mechanisms to expedite specific types of traffic. For example, USB host 40 may send data to USB device 42 using an IP mode. In this mode, network stack 44 may form IP headers for data packets, and transport and network layer 46 may use a type of service (ToS) field in the IP headers to distinguish different traffic types and provide higher priority for certain packets. However, such prioritized packet delivery is not always available. For example, USB host 40 may operate in a mode (e.g., a MA USB native mode) that does not use IP headers. Moreover, some network stack configurations and/or transport media (e.g., Bluetooth) may not have QoS support.

In some instances, such as instances in which QoS support is not available at network stack 44, when multiple services use the same network stack, or in other instances, higher priority packets may be blocked by other lower priority packets, which results in increased latency for the higher priority packets. In an example for purposes of illustration, a buffer of USB device 42 may be relatively large, which may allow USB host 40 to send a large amount of data to USB device 42 (as described, for example, with respect to FIG. 1 above). Head-of-line (HOL) blocking may occur when host PAL 64 issues a burst of bulk data transfers to network stack 44 for transmission to USB device 42. The latency associated with transmitting data packets may be proportional to the length of the queue of the data being sent. In this example, relatively time sensitive (higher priority) interrupt or isochronous packets may be blocked by the burst of bulk data. Low throughput at physical link 68, a scheduling policy implemented at network stack 44, or other factors may further aggravate this latency issue.

For example, devices that support the USB 3.0 standard may have relatively large buffers that may handle bursts of USB 3.0 data. Using a credit based flow control mechanism, such as the one described in the MA USB specification, bulk endpoints may have a large number of outstanding data transfers (e.g., transfers for which requests have been released to the network stack, but the responses have not yet been received), which may result in many pending packets waiting in a buffer of network stack 44 to be transmitted. The amount of data stored to the buffer may rise quickly with a burst of USB bulk traffic.

According to aspects of this disclosure, host PAL 64 may control the flow of USB data that is sent to network stack 44 based on a data transfer type of the USB data. For example, host PAL 64 may initially determine a data transfer type of USB data being transmitted. Host PAL 64 may, based on the determined transfer type, determine a priority of the USB data. Host PAL 64 may then transfer the USB data to network stack 44 based on the determined priority. In an example for purposes of illustration, host PAL 64 may determine whether the transfer type of the data is bulk, interrupt, isochronous, or another transfer type. Host PAL 64 may assign a higher priority to one or more of these transfer types than other transfer types. For example, host PAL 64 may assign a higher priority to interrupt and isochronous transfers than bulk transfers.

In some examples, host PAL 64 may determine the priority of the USB data using a threshold for outstanding transfer requests of the USB data transfer type. For example, according to aspects of this disclosure, host PAL 64 may determine thresholds for controlling the number of outstanding transfer requests (e.g., transfer requests that have been issued that have not been acknowledged) for one or more transfer types. Host PAL 64 may determine thresholds for each transfer type or less than all of the transfer types.

In an example for purposes of illustration, host PAL 64 may limit the number of outstanding bulk data transfer types using a threshold for bulk data transfers. In this example, host device 20 may restrict the number of outstanding bulk transfer requests to the threshold number, but may allow all other data transfer types to be sent to network stack 44 without restriction. Restricting the number of outstanding bulk data requests may prevent host PAL 64 from sending bulk data transfers to network stack 44 (e.g., and instead buffering the data at host PAL 64. By controlling the amount of bulk data that is sent to network stack 44, host PAL 64 may manage the amount of bulk data that is buffered at network stack 44. In this way, host PAL 64 may limit the amount of bulk data that is buffered at network stack 44, thereby permitting data of other transfer types to be processed at network stack 44 more quickly.

While not limited to any particular standard, the techniques may, in some instances, be used in conjunction with the MA USB standard and associated specified protocol stack. For example, USB communication over a wired serial bus may have relatively high bandwidth and relatively low packet delivery latency. The techniques of this disclosure, however, may be applicable to media that may have a relatively lower bandwidth and higher packet delivery latency.

Figure 3A:
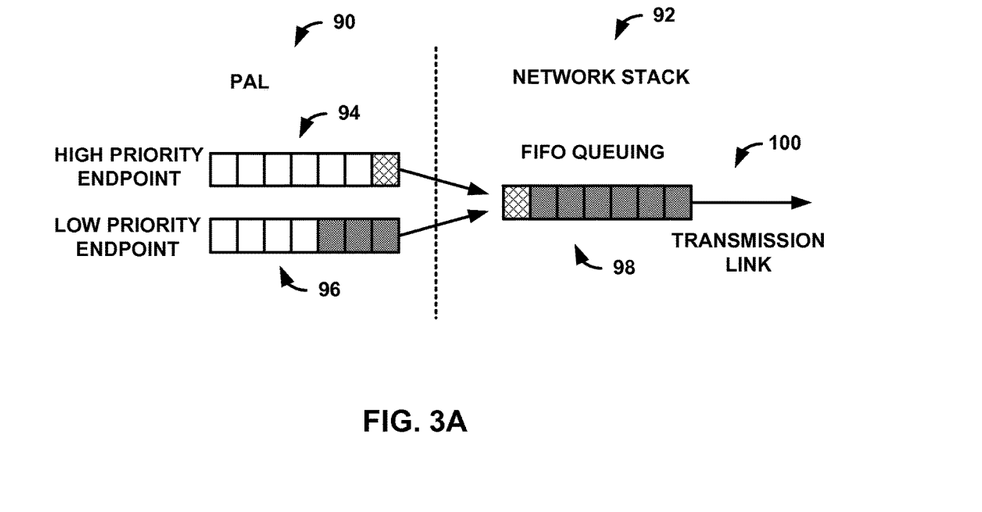
FIG. 3A is a conceptual diagram illustrating the transfer of data from a USB protocol adaptation layer (PAL) to a network stack.

FIG. 3A is a conceptual diagram illustrating a transfer of data from a USB PAL 90 (e.g., of USB host 40) to a network stack 92 (e.g., of USB host 40). In the example of FIG. 3A, PAL 90 includes first data 94 associated with a first data transfer type that is associated with a high priority endpoint, and second data 96 associated with a second data transfer type that is associated with a low priority endpoint. Network stack 92 includes a buffer 98 that operates on a first-in-first-out (FIFO) basis and is used to buffer data traffic received from PAL 90 prior to transmitting the data traffic over the transmission link 100.

In some instances, PAL 90 sends as much data to network stack 92 as can be received by a USB device that is receiving the data. For example, PAL 90 may use a credit based system to determine how much of first data 94 and second data 96 to send to network stack 92. In this example, PAL 90 may send first data 94 and second data 96 to network stack 92 as soon as it is available and without respect to the traffic type being sent.

When multiple endpoints are serviced in a USB session, however, some endpoints (e.g., interrupt or isochronous endpoints) may require lower packet delivery latency than other endpoints (e.g., bulk endpoints). In the example of FIG. 3A, first data 94 is associated with a higher priority endpoint that requires lower packet delivery latency, while second data 96 is associated with a lower priority endpoint. In instances where network stack 92 does not have QoS support, all outgoing packets share the same buffer 98 and a high priority packet may be blocked in buffer 98 by other prior lower priority packets. Such HOL blocking may cause high packet delivery latency, especially when the throughput of the transmission link 100 is low.

Figure 3B:
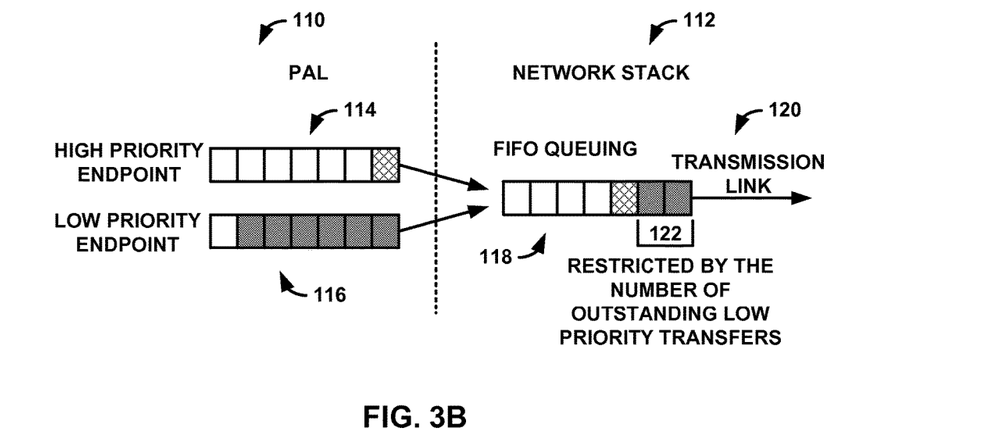
FIG. 3B is another conceptual diagram illustrating a transfer of data from a USB PAL to a network stack.

FIG. 3B is another conceptual diagram illustrating a transfer of data from a USB PAL 110 (e.g., of USB host 40) to a network stack 112 (e.g., of USB host 40). In the example of FIG. 3B, PAL 110 includes first data 114 associated with a first data transfer type that is associated with a high priority endpoint, and second data 116 associated with a second data transfer type that is associated with a low priority endpoint. Network stack 112 includes a buffer 118 that operates on a first-in-first-out (FIFO) basis and is used to buffer data traffic received from PAL 110 prior to transmitting the data traffic over the transmission link 120.

According to aspects of this disclosure, PAL 110 may use a priority-based flow control mechanism to manage the manner in which first data 114 and second data 116 is provided to network stack 112 for transmission over transmission link 120. For example, PAL 110 (which may be implemented, in some instances, by a USB host device, such as host device 20 or USB host 40) may determine a USB data transfer type of first data 114 and second data 116. PAL 110 may determine a priority of the USB data based on the determined transfer type. For example, PAL 110 may determine that data associated with a lower priority endpoint (e.g., bulk transfer type), such as second data 116, has a relatively low priority and is therefore subject to flow control. PAL 110 may then transfer the USB data from to network stack 112 based on the determined priority.

The flow control techniques described herein may reduce packet delivery latency of high priority packets, such as first data 114 in FIG. 3B. In some examples, according to aspects of this disclosure, PAL 110 may restrict the maximum queue length of buffer 118 to avoid long HOL blocking time for high priority packets, such as first data 114. For example, PAL 110 may regulate the speed of sending second data 116 to network stack 112. In some examples, PAL 110 may temporarily reduce a limit of outstanding transfers that are allowed for endpoints having the data transfer type of second data 116. In this example, second data 116 (the low priority packets) may remain queued in a buffer at PAL 110, instead of waiting in buffer 118 of network stack 112.

For example, by restricting the number of outstanding data transfers of a particular type that are allowed, PAL 110 is restricted front sending a high number of packets of second data 116 to buffer 118. Due to the fewer pending packets waiting in buffer 118, PAL 110 thereby reduces the HOL blocking time when high priority data arrives in buffer 118.

In the example of FIG. 3B, PAL 110 prioritizes sending first data 114 to network stack 112 over sending second data 116 to network stack 112. In this example, PAL 110 enforces a threshold for the number of outstanding data transfers of the transfer type of second data 116, but does not impose such a restriction on data transfers of the transfer type of first data 114. For example, PAL 110 restricts the number of outstanding data transfers of the transfer type of second data 116 to two (as indicated by bracket 122). In this way, PAL 110 is prevented from filling buffer 118 with second data 116, which potentially reduces the amount of second data 116 in buffer 118 and the blocking time associated with such data. While a threshold of two is described for purposes of illustration, it should be understood that PAL 110 may use a variety of other thresholds.

Although imposing thresholds on the number of outstanding data transfers of a particular data transfer type may reduce the delivery latency of high priority packets, such techniques may, in some instances, reduce the end-to-end data throughput of certain data transfers, especially when transmission link 120 is able to provide higher throughput. To avoid unnecessarily sacrificing throughput of a particular data transfer type, according to aspects of this disclosure, PAL 110 may dynamically adjust the thresholds (in addition to having static thresholds or as an alternative). In an example for purposes of illustration, PAL 110 may set a threshold for the number of outstanding bulk data transfers that are allowed. In this example, increasing the threshold allows more outstanding bulk transfers, leading to potentially higher data throughput. Conversely, decreasing the threshold lowers the maximum queue length of buffer 118 to reduce HOL blocking time.

In some instances, PAL 110 may use a buffer that is separate from buffer 118 to store data (such as first data 114 and second data 116) that has been restricted from being sent to buffer 118. For example, PAL 110 may store the data to the buffer until the number of outstanding data transfers is less than or equal to a threshold number. PAL 110 may then release the data from the buffer to be transferred to buffer 118. In addition, PAL 110 may also de-allocate a credit of a buffer associated with the USB device receiving the data. That is, PAL 110 may manage the credit based system for data transfer described herein based on the data being released from the buffer.

PAL 110 may dynamically determine a data transfer type threshold based on latency associated with delivering certain USB data. For example, PAL 110 may dynamically adjust the flow control techniques described herein based on observed latency associated with an interrupt transfer. There are several heuristics that may be used to estimate interrupt packet delivery latency, such as an amount of time associated with sending a PAL request to receiving a PAL response for a interrupt transfer (e.g., as measured using a Transfer-CompleteTime variable of MA USB), transfer timeout and/or retry calculations, a queue length of buffer 118, or the like.

According to aspects of this disclosure, PAL 110 may dynamically determine one or more data transfer type thresholds using the heuristics. For example, if PAL 110 determines that interrupt packet delivery latency (or another type of data packet) is high, PAL 110 may reduce a limit of outstanding transfers that are allowed for low priority packets. In this example, the low priority packets may remain queued in a buffer at PAL 110, instead of waiting in buffer 118 of network stack 112. Alternatively, if PAL 110 determines that interrupt packet delivery latency (or another type of data packet) is low, PAL 110 may increase a limit of outstanding transfers that are allowed for low priority packets. In this example, a relatively greater number of low priority packets may be sent to buffer 118 of network stack 112, thereby increasing throughput. By dynamically adjusting the thresholds for certain data transfer types, PAL 110 may reduce the transfer latency for high priority transfers (thereby providing a positive user experience), while avoiding an unnecessary sacrifice of throughput.

In some instances, thresholds for outstanding data transfer types may additionally or alternatively be determined and/or dynamically adjusted based on use cases. For example, certain types of USB devices may have different characteristics. In an example for purposes of illustration, as noted above, a user may relatively sensitive to pointer lag associated of a USB mouse cursor, so there may be relatively low tolerance for packet delivery latency. In this example, thresholds of outstanding data transfer types may be determined and/or dynamically adjusted to reduce latency (e.g., by limiting the number of outstanding transfers that are allowed for a particular data (type). In another example, a user may be less sensitive to lag associated with typing on a USB keyboard. In this example, thresholds of outstanding data transfer types may be determined and/or dynamically adjusted to maximize throughput (e.g., by increasing the number of outstanding transfers that are allowed for a particular data type). Accordingly, according to aspects of this disclosure, thresholds for outstanding data transfer types may additionally or alternatively be determined and/or dynamically adjusted based on the type of USB device receiving the data or based on other factors.

According to some examples, PAL 110 may enable or disable flow control altogether. For example, PAL 110 may dynamically implement (or disable) the above-described thresholds based on observed packet delivery latency, receiving USB device capabilities (e.g., a size of a buffer of the receiving USB device), network conditions, or other factors. For example, PAL 110 may typically operate without the above-described thresholds. PAL 110 may enable the flow control techniques of this disclosure upon observing packet delivery latency, receiving an indication that a USB device has a relatively large buffer (e.g., which may result in HOL blocking, as discussed herein), observing that a network has relatively low bandwidth, or other factors. PAL 110 may disable the flow control techniques upon such conditions being relieved.

According to aspects of this disclosure, the flow control techniques may be implemented solely in a USB layer (e.g., such as an MA USB layer), without any modification of a network stack, such as network stack 112. As noted above, the techniques may reduce high priority packet delivery latency when network stack 112 does not have priority queue support. However, even assuming network stack 112 does have QoS support, other traffics may share buffer 118 as the USB transfers. In such instances, the techniques may still be used to regulate the low priority traffic.

In an example for purposes of illustration, Miracast traffic may share buffer 118 with second data 116. In this example, PAL 110 may regulate the flow of second data 116 to buffer 118 to fulfill latency and/or throughput requirements of the Miracast traffic. For example, if PAL 110 determines that there is a relatively large amount of Miracast traffic (or high priority Miracast traffic) stored to buffer 118 for transmission over the network, PAL 110 may reduce a limit of outstanding transfers that are allowed for low priority packets. In this example, the low priority packets may remain queued in a buffer at PAL 110, instead of waiting in buffer 118 of network stack 112, thereby enabling the Miracast traffic to be sent. Alternatively, if PAL 110 determines that buffer 118 is relatively free of other traffics, PAL 110 may increase a limit of outstanding transfers that are allowed for low priority packets. In this example, a relatively greater number of low priority packets may be sent to buffer 118 of network stack 112, thereby increasing throughput of the USB data.

Figure 4:
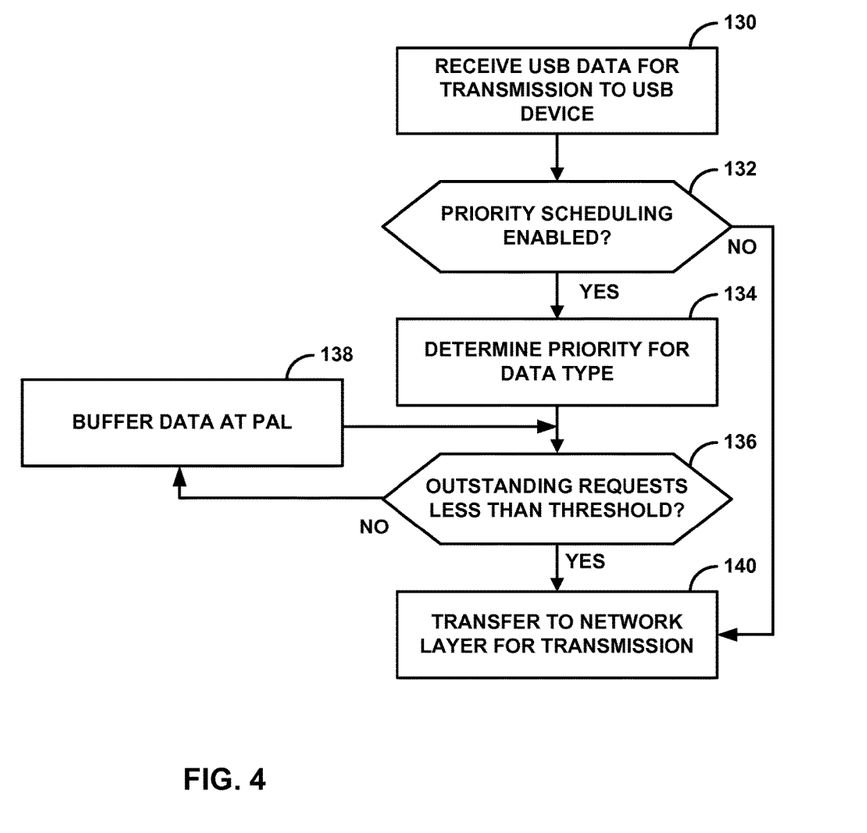
FIG. 4 is a flowchart illustrating an example of data transmission in accordance with the techniques of this disclosure.

FIG. 4 is a flowchart illustrating an example of USB data transmission in accordance with the techniques of this disclosure. For example, FIG. 4 generally illustrates a PAL of a host USB device sending data to a network layer for transmission across a transport medium. While described with respect to host device 20 for purposes of example, it should be understood that the techniques of FIG. 4 may be carried out by a variety of other devices.

In the example of FIG. 4, host device 20 receives USB data for transmission to a USB device, such as USB device 24 (130). For example, host device 20 may receive data from a driver associated with host device 20. Host device 20 may then determine whether priority scheduling is enabled (132). For example, as noted above, according to aspects of this disclosure, host device 20 may dynamically enable (or disable) a priority based flow control mechanism that is based on the USB data transfer type of the data being transmitted based on observed packet delivery latency, receiving USB device capabilities (e.g., a size of a buffer of the receiving USB device), network conditions, or other factors, as described above.

When priority scheduling is enabled (the yes branch of step 132), host device 20 may determine a priority for the type of data being transmitted (134). For example, according to aspects of this disclosure, host device 20 may identify the data being transmitted as one of bulk data, interrupt data, isochronous data, or another data type. In some instances, host device 20 may determine a priority for one or more of such data transfer types.

According to aspects of this disclosure, host device 20 may determine a priority according to a threshold of outstanding data transfer requests for the type of data being transmitted. For example, host device 20 may determine thresholds for controlling the number of outstanding transfer requests (e.g., transfer requests that have been issued that have not been acknowledged) for one or more transfer types. In some examples, when a number of outstanding transfer requests of the transfer type of the USB data being transmitted is lower than or equal to the threshold, host device 20 may transfer the USB data from the PAL of host device 20 to a network layer of host device 20. Conversely, when the number of outstanding transfer requests of the transfer type of the USB data is greater than the threshold, host device 20 may buffer the USB data in a transfer queue at the PAL of host device 20 until the number of outstanding transfer requests of the transfer type of the USB data is lower than the threshold.

Accordingly, in the example of FIG. 4, host device 20 may determine whether a number of outstanding transfer requests for the type of data being transmitted is less than a threshold value (136). If the number of requests is not less than the threshold (the no branch of step 136), host device 20 may buffer the data at the PAL level until the number of outstanding requests is less than the threshold (138). If the number of requests is less than the threshold (the yes branch of step 136), host device 20 may transfer the data to the network layer (e.g., release the data from the PAL buffer to a buffer of a network stack) for transmission to a USB device (140).

It should also be understood that the steps shown and described with respect to FIG. 4 are provided as merely one example. That is, the steps of the method of FIG. 4 need not necessarily be performed in the order shown in FIG. 4, and fewer, additional, or alternative steps may be performed.

As noted above, while certain techniques of this disclosure are generally described with respect to USB standards, it should be understood that USB standards are only examples of a communication standard that may be consistent with this disclosure. Thus, although the techniques are described in the context of USB standards, other similar communication standards (e.g., an IEEE 1394 standard (known as "FireWire"), an Ethernet standard, a Serial Advanced Technology Attachment standard, a high-definition multimedia interface (HDMI) standard, and a Thunderbolt standard) or even similar future communication standards or techniques may likewise benefit from the teaching of this disclosure.

In one of more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for processing data, the method comprising:
   determining a plurality of types of Universal Serial Bus (USB) data being provided for transmission, wherein the determined plurality of types of USB data comprises a first type of the USB data and a second type of the USB data;

determining a priority of the USB data based on the determined plurality of types of the USB data; and controlling, based on the determined priority of the determined plurality of types of USB data, transfer of the USB data from a protocol adaptation layer (PAL) of a USB host to a network layer of the USB host, wherein the PAL of the USB host is responsible for management of at least one USB device that receives the USB data from the network layer, wherein determining the priority of the USB data based on the determined plurality of types of the USB data comprises determining a threshold for outstanding transfer requests of the first type of the USB data, wherein the outstanding transfer requests comprise requests that have been released to the network layer and are waiting to be transmitted, and wherein controlling transfer of the USB data based on the determined priority comprises:

in a first instance where a number of outstanding transfer requests of the first type of the USB data is lower than or equal to the threshold, storing the first type of the USB data to a buffer associated with the PAL, and, subsequent to the storing, controlling the transfer of the first type of the USB data from the PAL to the network layer;

in a second instance where the number of outstanding transfer requests of the first type of the USB data is greater than the threshold, holding the first type of the USB data in a transfer queue at the PAL until the number of outstanding transfer requests of the first type of the USB data is lower than or equal to the threshold; and in the second instance where the number of outstanding transfer requests of the first type of the USB data is greater than the threshold, controlling transfer of the second type of the USB data from the PAL to the network layer.

2. The method of claim 1, wherein determining the priority comprises identifying the first type of the USB data as one of bulk data, isochronous data, or interrupt data.

3. The method of claim 2, wherein determining the priority comprises assigning a lower priority to the bulk data than the isochronous data and the interrupt data.

4. The method of claim 1, wherein the first type of the USB data comprises bulk data, and wherein determining the threshold for outstanding transfer requests comprises determining a threshold for outstanding bulk data transfer requests.

5. The method of claim 1, further comprising dynamically determining the threshold based on latency associated with delivering second USB data from the USB host to a USB device that receives the second USB data.

6. The method of claim 5, wherein the second USB data is at least one interrupt packet of interrupt data, the method further comprising:

determining the latency based on a difference between a time at which the second USB data is sent to the network layer and a time at which an acknowledgement from the USB device is received.

7. The method of claim 1, wherein, subsequent to storing, controlling the transfer of the first type of the USB data comprises releasing the first type of the USB data stored to the buffer associated with the PAL to a USB device buffer associated with the network layer.

8. The method of claim 7, further comprising de-allocating a credit of the USB device buffer upon the first type of the USB data being released from the buffer associated with the PAL of the USB host.

9. The method of claim 1, wherein the first type of the USB data comprises at least one USB data packet.

10. A device for processing data, the device comprising:
one or more processors configured to:
determine a plurality of types of Universal Serial Bus (USB) data being provided for transmission, wherein the determined plurality of types of USB data comprises a first type of the USB data and a second type of the USB data;

determine a priority of the USB data based on the determined plurality of types of the USB data; and control, based on the determined priority of the determined plurality of types of USB data, transfer of the USB data from a protocol adaptation layer (PAL) of a USB host to a network layer of the USB host, wherein the PAL of the USB host is responsible for management of at least one USB device that receives the USB data from the network layer, wherein to determine the priority of the USB data based on the determined plurality of types of the USB data, the one or more processors are configured to determine a threshold for outstanding transfer requests of the first type of the USB data, wherein the outstanding transfer requests comprise requests that have been released to the network layer and are waiting to be transmitted, and wherein to control transfer of the USB data based on the determined priority, the one or more processors are configured to:

based on a number of outstanding transfer requests of the first type of the USB data being lower than or equal to the threshold, storing the first type of the USB data to a buffer associated with the PAL, and, subsequent to the storing, controlling the transfer of the first type of the USB data from the PAL to the network layer;

based on the number of outstanding transfer requests of the first type of the USB data being greater than the threshold, holding the first type of the USB data in a transfer queue at the PAL until the number of outstanding transfer requests of the first type of the USB data is lower than or equal to the threshold; and based on the number of outstanding transfer requests of the first type of the USB data is greater than the threshold, control transfer of the second type of the USB data from the PAL to the network layer.

11. The device of claim 10, wherein to determine the priority, the one or more processors are configured to identify the first type of the USB data as one of bulk data, isochronous data, or interrupt data.

12. The device of claim 11 wherein to determine the priority, the one or more processors are configured to assign a lower priority to the bulk data than the isochronous data and the interrupt data.

13. The device of claim 10, wherein the first type of the USB data comprises bulk data, and wherein to determine the threshold for outstanding transfer requests, the one or more processors are configured to determine a threshold for outstanding bulk data transfer requests.

14. The device of claim 10, wherein the one or more processors are further configured to dynamically determine the threshold based on latency associated with delivering second USB data from the USB host to a USB device that receives the second USB data.

15. The device of claim 14, wherein the second USB data is at least one interrupt packet of interrupt data, and wherein the one or more processors are further configured to:
  determine the latency based on a difference between a time at which the second USB data is sent to the network layer and a time at which an acknowledgement from the USB device is received.

16. The device of claim 10, wherein the one or more processors are configured to, subsequent to the storing of the first type of the USB data from the PAL, release the first type of the USB data stored to the buffer associated with the PAL to a USB device buffer associated with the network layer.

17. The device of claim 16, wherein the one or more processors are further configured to de-allocate a credit of the USB device buffer upon the first type of the USB data being released from the buffer associated with the PAL of the USB host.

18. An apparatus for processing data, the apparatus comprising:
  means for determining a plurality of types of Universal Serial Bus (USB) data being provided for transmission to a USB device, wherein the determined plurality of types of USB data comprises a first type of the USB data and a second type of the USB data;
  means for determining a priority of the USB data based on the determined plurality of types of the USB data; and
  means for controlling, based on the determined priority of the determined plurality of types of USB data, transfer of the USB data from a protocol adaptation layer (PAL) of the apparatus to a network layer of the apparatus, wherein the PAL of the USB host is responsible for management of at least one USB device that receives the USB data from the network layer,
  wherein the means for determining the priority of the USB data based on the determined plurality of types of the USB data comprises means for determining a threshold for outstanding transfer requests of the first type of the USB data, wherein the outstanding transfer requests comprise requests that have been released to the network layer and are waiting to be transmitted, and wherein the means for controlling transfer of the USB data based on the determined priority comprises:
    means for storing the first type of the USB data to a buffer associated with the PAL based on a number of outstanding transfer requests of the first type of the USB data being lower than or equal to the threshold, and means for controlling the transfer of the first type of the USB data from the PAL to the network layer, subsequent to the storing, based on a number of outstanding transfer requests of the first type of the USB data being lower than or equal to the threshold;
    means for holding the first type of the USB data in a transfer queue at the PAL until the number of outstanding transfer requests of the first type of the USB data is lower than or equal to the threshold based on the number of outstanding transfer requests of the first type of the USB data being greater than the threshold; and
    means for controlling transfer of the second type of the USB data from the PAL to the network layer based on the number of outstanding transfer requests of the first type of the USB data being greater than the threshold.

19. The apparatus of claim 18, wherein the means for determining the priority comprises means for identifying the first type of the USB data as one of bulk data, isochronous data, or interrupt data.

20. The apparatus of claim 19, wherein the means for determining the priority comprises means for assigning a lower priority to the bulk data than the isochronous data and the interrupt data.

21. The method of claim 1, wherein controlling the transfer of the USB data comprises controlling a credit-based transfer that is based on a buffering capability of a USB device that receives the first type of the USB data from the network layer.

22. The method of claim 1, wherein the outstanding transfer requests have been released to the network layer and are waiting to be transmitted, and responses, for the outstanding transfer requests, have not been received from a USB device that receives the USB data from the network layer.

23. The device of claim 10, wherein to control the transfer of the USB data, the one or more processors are configured to control a credit-based transfer that is based on a buffering capability of a USB device that receives the first type of the USB data from the network layer.

24. The device of claim 10, wherein the outstanding transfer requests have been released to the network layer and are waiting to be transmitted, and responses, for the outstanding transfer requests, have not been received from a USB device that receives the USB data from the network layer.

25. The device of claim 10, wherein the USB data comprises at least one USB data packet.

26. A Universal Serial Bus (USB) host device, the USB host device comprising:
  one or more processors configured to:
    determine a plurality of types of Universal Serial Bus (USB) data being provided for transmission, wherein the determined plurality of types of USB data comprises a first type of the USB data and a second type of the USB data;
    determine a priority of the USB data based on the determined plurality of types of the USB data; and
    control, based on the determined priority of the determined plurality of types of USB data, transfer of the USB data from a protocol adaptation layer (PAL) of the USB host device to a network layer of the USB host device, wherein the PAL of the USB host is responsible for management of at least one USB device that receives the USB data from the network layer,
  wherein to determine the priority of the USB data based on the determined plurality of types of the USB data, the one or more processors are configured to determine a threshold for outstanding transfer requests of the first type of the USB data, wherein the outstanding transfer requests comprise requests that have been released to the network layer and are waiting to be transmitted, and wherein to control transfer of the USB data based on the determined priority, the one or more processors are configured to:
    based on a number of outstanding transfer requests of the first type of the USB data being lower than or equal to the threshold, store the first type of the USB data to a buffer associated with the PAL, and, subsequent to the storing, control the transfer of the first type of the USB data from the PAL to the network layer;
    based on the number of outstanding transfer requests of the first type of the USB data being greater than the threshold, hold the first type of the USB data in a transfer queue at the PAL until the number of outstanding transfer requests of the first type of the USB data is lower than or equal to the threshold; and based on the number of outstanding transfer requests of the first type of the USB data being greater than the threshold, control transfer of the second type of the USB data from the PAL to the network layer; and a transmitter configured to package the USB data for transmission using a network protocol of the network layer.

\* \* \* \* \*